United States Patent
Vasanthakumari et al.

(10) Patent No.: US 8,327,378 B1
(45) Date of Patent: Dec. 4, 2012

(54) METHOD FOR GRACEFULLY STOPPING A MULTI-THREADED APPLICATION

(75) Inventors: Reghuram R. Vasanthakumari, Kerala (IN); Anand Sridharan, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 395 days.

(21) Appl. No.: 12/634,814

(22) Filed: Dec. 10, 2009

(51) Int. Cl.
G06F 3/00 (2006.01)
G06F 9/44 (2006.01)
G06F 9/46 (2006.01)
G06F 13/00 (2006.01)

(52) U.S. Cl. ......... 718/106; 718/100; 718/102; 719/318

(58) Field of Classification Search .................. None
See application file for complete search history.

(56) References Cited

U.S. PATENT DOCUMENTS

| | | | |
|---|---|---|---|
| 7,512,950 B1 * | 3/2009 | Marejka | 718/106 |
| 2003/0069917 A1 * | 4/2003 | Miller | 709/105 |
| 2005/0028157 A1 * | 2/2005 | Betancourt et al. | 718/100 |
| 2007/0027929 A1 * | 2/2007 | Whelan | 707/200 |
| 2009/0172686 A1 * | 7/2009 | Chen et al. | 718/103 |
| 2010/0107017 A1 * | 4/2010 | Munjal et al. | 714/49 |

* cited by examiner

*Primary Examiner* — Emerson Puente
*Assistant Examiner* — Jonathan R Labud
(74) *Attorney, Agent, or Firm* — Krishnendu Gupta; Robert Kevin Perkins; Joseph D'Angelo (57) ABSTRACT

A method, system, and a computer program product for gracefully stopping a multi-threaded application. An aspect of the present invention requires each thread in a multi-threaded application to acquire a work permit before performing a task and to release the work permit after completion of the performance of the task. The multi-threaded application is stopped only when all of the work permits have been released by the threads in the application. The release of all of the set of work permits indicates that all the currently performing tasks/threads are completed, thereby "gracefully" stopping the multi-threaded application.

20 Claims, 4 Drawing Sheets

METHOD FOR GRACEFULLY STOPPING A MULTI-THREADED APPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to application development, and more specifically to methods, systems, and a computer program product for gracefully stopping a multi-threaded application.

BACKGROUND

In many environments, applications are designed to execute as multiple streams/threads of execution, with each thread representing a portion of the application that may execute concurrently with other portions/threads. Such applications are referred to as multi-threaded applications, with the multiple threads in an application sharing resources such as memory, IO devices, etc. One reason for having multiple threads in an application is to perform multiple tasks concurrently. As such, in the event that a multi-threaded application needs to be stopped, it is desirable that the application is "gracefully" stopped only after the currently performing tasks/threads are completed.

SUMMARY

An aspect of the present invention requires each thread in a multi-threaded application to acquire a work permit before performing a task and to release the work permit after completion of the performance of the task. On a stop indication, the threads may not acquire any of the rest of the set of work permits. There is a wait for the subset of the set of work permits to be released, and the multi-threaded application is stopped only when all of the set of work permits are released by the plurality of threads in the application.

BRIEF DESCRIPTION OF DRAWINGS

The above and further advantages of the present invention may be better under stood by referring to the following description taken into conjunction with the accompanying drawings in which.

DETAILED DESCRIPTION

Current approaches to stopping a multi-threaded application entails keeping track of the threads currently performing tasks in the application, sending a stop notification to each of the threads and then stopping the application after a pre-configured duration. Each thread is required to be designed to listen for this stop notification and to perform desired/necessary actions on reception of the stop indication.

It is generally not possible for a thread to complete the currently performing task within the pre-configured duration (which is typically small). As such, the application may not be gracefully stopped after the pre-configured duration. The techniques described herein provide the ability for each thread to indicate the completion of the currently performing task, thereby ensuring that the multi-threaded application is gracefully stopped only after all the currently performing tasks/threads are completed.

In one embodiment, each of the threads in the application is required to acquire one of a set of work permits before performing a task and to release the acquired work permit after completion of performance of the task. The threads are generally allowed to acquire and release work permits for performance of the various tasks. However, when a stop notification indicating that the multi-threaded application is to be stopped is received, the threads are denied from acquiring any more of the work permits, thereby ensuring that new threads/tasks are not performed. While denying work permits, the application also waits for the already acquired work permits to be released by the currently executing threads. The multi-threaded application is "gracefully" stopped only when all of the set of work permits are released by the threads in the multi-threaded application.

In a preferred approach, the maintenance of the set of work permits is implemented as a semaphore indicating a count of the number of work permits (tasks that can be concurrently performed). As is well known, semaphores are data values/types used for restricting access to shared resources in a multi-threaded environment. A semaphore for a shared resource is a count of instances of the shared resource that can be concurrently accessed (are available) by different threads at any given time instance. A semaphore is typically initialized to the maximum number of instances of the shared resource. The acquiring of an instance of a shared resource is an atomic operation of checking that an instance is available and then decreasing the count (and waiting if the instance is not available), while releasing an instance is performed by increasing the count.

Several techniques of the present invention may be used for gracefully shutting down a system executing multiple threads. For example, one or more instructions constituting an operating system executing in the system may be designed to identify that a critical error has occurred in the system and to "gracefully" shutdown the system after the currently performing tasks/threads in the system are completed.

The techniques of the present invention may be particularly suitable when the multi-threaded applications/operating systems are implemented in Java programming environment (containing components such as the Java programming language, Java Virtual Machine, Java based servers/browsers, etc. all available from Sun Microsystems). In particular, the steps of maintaining work permits, allowing work permits to be acquired/released, receiving a stop notification, denying work permits to be acquired, waiting for acquired work permits to be released and then stopping the application together may be utilized as a design pattern for gracefully stopping any multi-threaded application implemented in the Java programming environment.

Reference is now made in detail to exemplary embodiments of the invention, examples of which are illustrated in the accompanying Figures.

Figure 1:
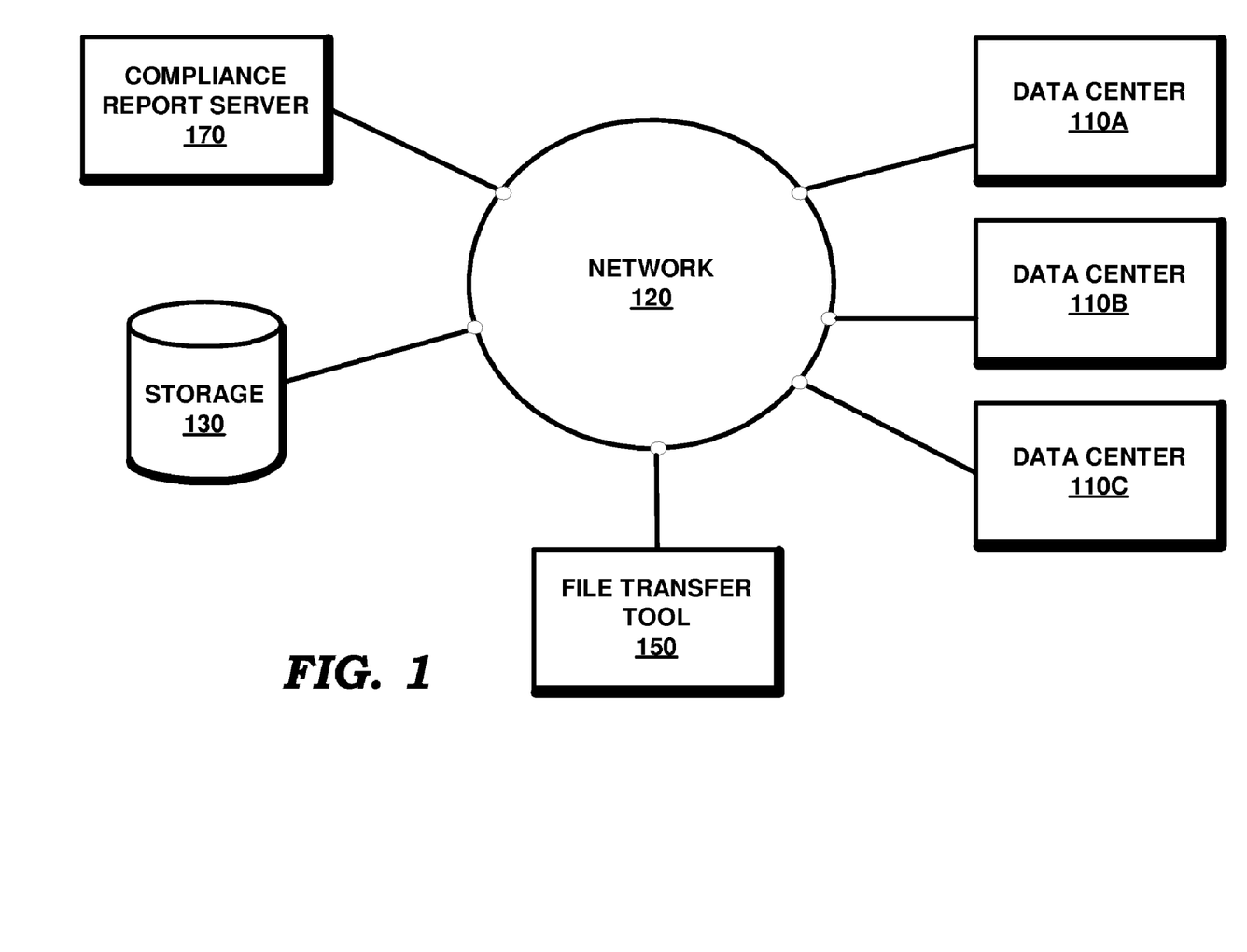
FIG. 1 shows an example environment in which several aspects of the present invention are implemented in one embodiment.

FIG. 1 shows an example environment in which several aspects of the present invention are implemented in one embodiment. The example environment is shown containing data centers 110A-110C, storage 130, compliance report server 170 and file transfer tool 150 connected by network 120. However, the example environment may contain more number/type of data centers, servers and storages, depending on the purpose for which the environment is designed.

Each of data centers 110A-110C represents a facility that hosts applications handling the core business and operational data of one or more customer organizations. Each data center may contain different types/number of infrastructure elements such as computer systems, storage systems, network devices, power supplies, environmental controls, security devices, etc. that operate together to facilitate hosting of different types/number of applications.

Network 120 provides connectivity between the various systems of FIG. 1 and may be implemented using protocols such as Transmission Control Protocol (TCP) and/or Internet Protocol (IP), well known in the relevant arts.

Storage 130 represents an external non-volatile storage system facilitating storage and retrieval of a collection of data by other systems connected to network 120. Storage 130 may be implemented as a relational database system and therefore provide storage and retrieval of data using structured queries such as SQL (Structured Query Language). Alternatively, storage 130 may be implemented as a file system providing storage and retrieval of data in the form of one or more files organized as one or more directories, as is well known in the relevant arts. In one embodiment noted below, the storing/retrieving of data is performed by invoking appropriate operations of a web service exposed by storage 130.

Compliance report server 170 is a server system that generates a compliance report for a data center (such as 110A-110C). The compliance report indicates whether the infrastructural elements in the data center are compliant/in accordance with established guidelines/specifications provided by a standards body, such as the Institute of Electrical and Electronics Engineers (IEEE), or necessitated by legislation. Such compliance reports often are required to be generated before and/or after a data center is migrated or upgraded.

In one embodiment, agents (not shown) executing in a data center (e.g. 110A) captures compliance information (including software/hardware dependencies) about the infrastructural elements in the data center and stores the captured information in the form of data files. The data files containing the compliance information are then transferred from the data center to storage 130 (for example, by invoking the web service exposed by storage 130). Compliance report server 170 then generates the compliance reports for a data center (110A) based on the data files in storage 130 related to the data center. The customers may then act on the non-compliance issues indicated in the generated compliance reports.

File transfer tool 150 is designed to transfer the data files from each of data centers 110A-110C to storage 130. Since the number (100-1000) and size (1 kilobyte to 1 Gigabyte) of data files containing the compliance information is generally variable, file transfer tool 150 is implemented as a multi-threaded application, with each thread being designed to perform the task of transferring one of the data files from a data center to storage 130.

It may be desirable that the task of transferring each data file is performed completely, for example, to ensure that the compliance information stored on storage 130 is in a proper state for generation of the compliance report. Thus, in a scenario that a stop indication is received, file transfer tool 150 is required to be gracefully stopped after all the currently performing tasks of transferring data files is completed.

Figure 2:
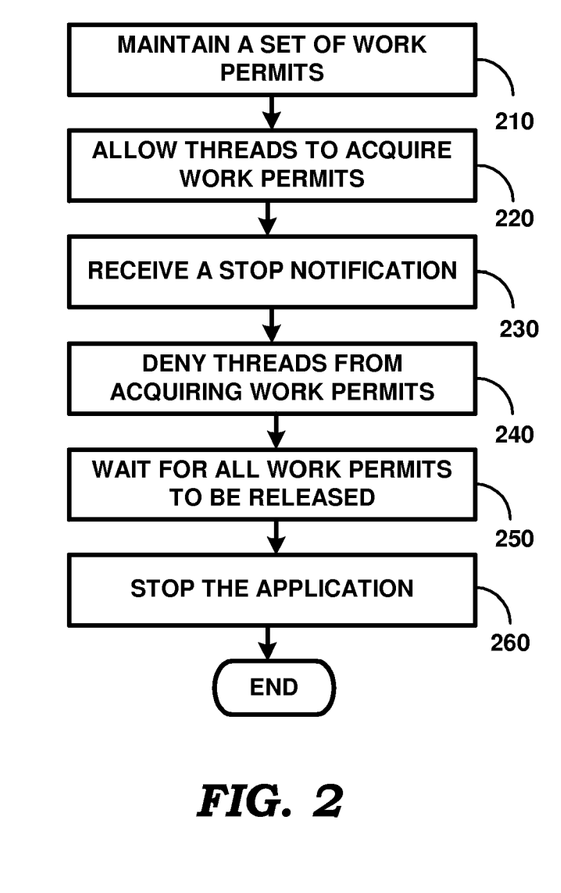
FIG. 2 shows an overview of an embodiment of gracefully stopping a multi-threaded application, such as file transfer tool 150 of FIG. 1.

FIG. 2 shows an overview of an embodiment of gracefully stopping a multi-threaded application, such as file transfer tool 150 of FIG. 1. However, in alternative embodiments, some of the steps may be performed in a different sequence than that depicted below, as suited to the specific environment, as will be apparent to one skilled in the relevant arts.

In step 210, a set of work permits is maintained, wherein each of the threads in the multi-threaded application is required to acquire one of the set of work permits before performing a task and to release the acquired work permit after completion of performance of the task. Thus, each of the threads of file transfer tool 150 is required to acquire a work permit before starting the transfer of a data file from a data center to storage 130 and to release the work permit after the performance of the transfer is complete.

In one approach, the maintenance of the set of work permits is implemented as a semaphore indicating a count of the number of work permits (tasks that can be concurrently performed). The semaphore is initialized to the maximum number of tasks that can be concurrently performed (for example, 20).

In step 220, the multiple threads in the multi-threaded applications are allowed to acquire (and also release) work permits. The acquiring of a work permit is performed by an atomic operation comprising checking that the count is greater than zero (indicating that a work permit is available) and decreasing the count by one and releasing a work permit is performed by increasing the count by one.

Thus, when a request for acquiring a work permit is received after the semaphore is initialized, the count is decreased by one (to give 19) since the count is greater than zero. Similarly, for each acquiring of the work permit, the count is decreased by one (to give, 18, 17, etc.) until the count is 0. Any further requests (after the count is 0) for acquiring work permits is blocked/denied (since the check fails), thereby ensuring that new tasks/threads cannot be performed, until an acquired work permit is released by a thread (causing the count to be increased by one and thereby satisfying the check of count being greater than zero).

In step 230, a stop notification indicating that the multi-threaded application is to be stopped is received. The stop notification may be received in response to a user input, for example to indicate termination of the application.

Alternatively, the stop notification may be a notification of an error from one of the threads in the multi-threaded application. For example, when one of the threads is unable to access storage 130, the thread may send a file 10 error/stop notification to the multi-threaded application. The stop indication may also be sent for one of a connectivity error, an invalid filename error, and an application error.

The stop notification may also be received when a system executing the multi-threaded application is sought to be shutdown, for example, when the error is determined to be a critical error requiring the system to be shutdown.

In step 240, the threads of the multi-threaded application are denied from acquiring more of the set of work permits (in particular, work permits that have not yet been acquired). Thus, any requests for acquiring a work permit are denied, even when the semaphore is not zero (in other words, even when work permits are available). The denial of acquiring requests ensures that new threads/tasks are not started in the multi-threaded application.

In step 250, the multi-threaded application waits for all the work permits to be released. In particular, the multi-threaded application waits until all the already acquired work permits are released by the threads in the multi-threaded application. Since an acquired work permits is released only after completion of the performance of a corresponding task, waiting for the release of all of the work permits ensures that all currently performing tasks/threads are completed. Thus, the multi-threaded application may wait until the semaphore count is equal to the initialized value (e.g. 20), which indicates that all the work permits are released.

In step 260, the multi-threaded application is stopped. It may be appreciated that the steps of denying acquiring of work permits (240) and waiting for already acquired work permits to be released (250) together ensures that the multi-threaded application is "gracefully" stopped after all the currently performing tasks are completed.

Thus, a multi-threaded application such as file transfer tool 150 of FIG. 1 is gracefully stopped, when a stop notification is received. In the scenario, that the stop notification is for shutdown of the system, an addition step of shutting down the system may be performed after the stopping of the multi-threaded application. Furthermore, several techniques of the present invention may be used for gracefully shutting down a system executing multiple threads.

Figure 3:
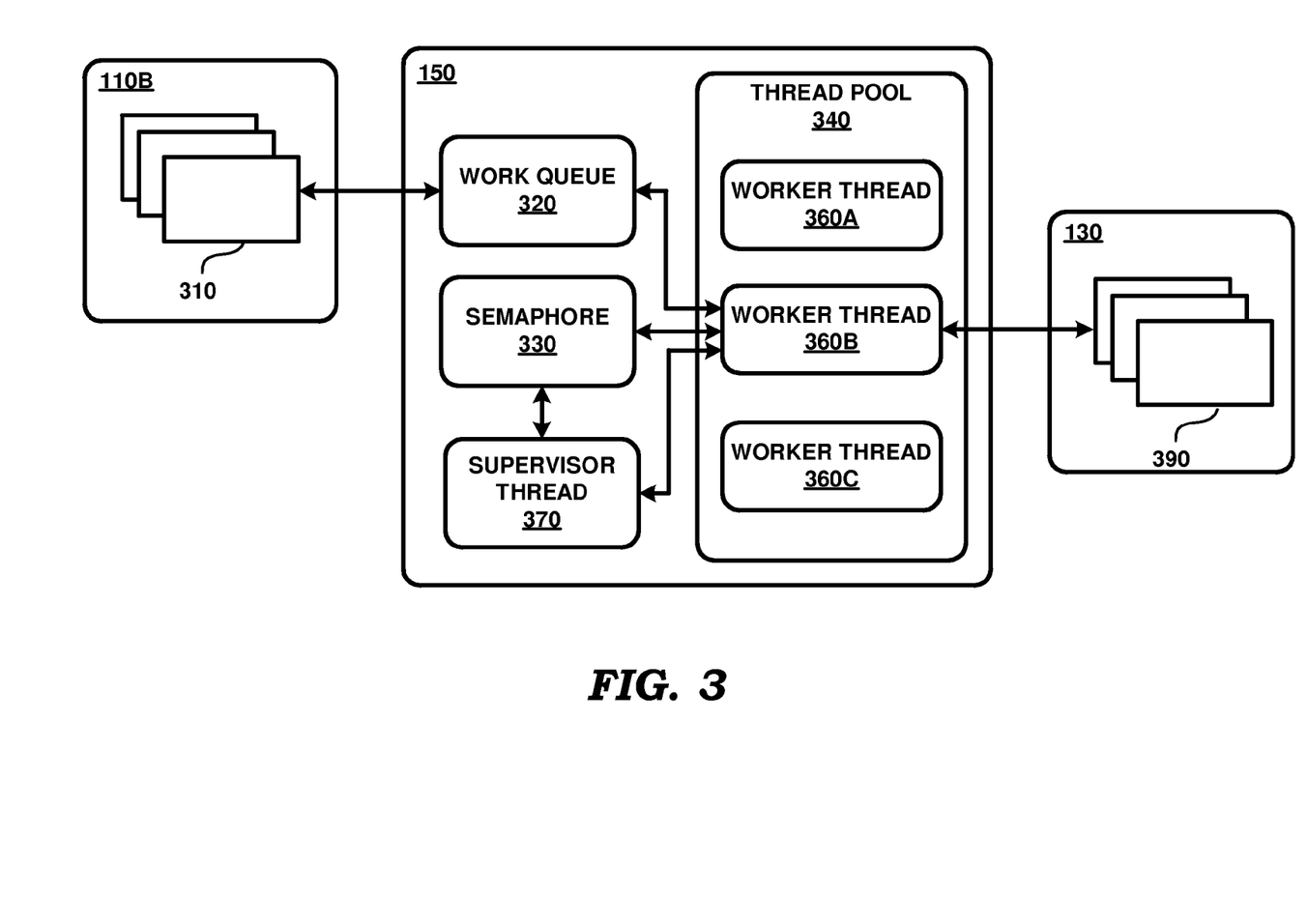
FIG. 3 shows components of an example implementation for graceful stopping of a multi-threaded application, such as file transfer tool 150 of FIG. 1.

FIG. 3 shows components of an example implementation for graceful stopping of a multi-threaded application, such as file transfer tool 150 of FIG. 1. Though only the transfer of data files between a single data center (110B) and storage 130 is shown, the data files from other data centers may be similarly performed by file transfer tool 150.

Data center 110B is shown storing data files 310 that are sought to be transferred to storage 130 (as corresponding ones of data files 390). Data files 310 represents one or more files that contain compliance information related to applications hosted for a customer in data center 110B. Data files 310 are generated by agents executing in data center 110B.

File transfer tool 150, a multi-threaded application is implemented to gracefully stop according to several aspects of the present invention. File transfer tool 150 is shown containing work queue 320, semaphore 330, thread pool 340 having worker threads 360A-360C, and supervisor thread 370.

Work queue 320 maintains (pending) tasks that are to be performed by the threads in file transfer tool 150. Each of the tasks corresponds to the transferring of one of data files 310 from data center 110B to storage 130. In one approach, the size of work queue 320 is fixed, and the tasks for each of data files 310 are added as and when tasks are removed from queue. Alternatively, tasks for each of data files 310 may be added to work queue 320 initially before performance of any of the tasks.

Semaphore 330 maintains a count of the number of work permits (tasks that can be concurrently performed) that can be acquired by the threads in file transfer tool 150 at any given time instance. Semaphore 330 is initialized to the maximum number of work permits that can be acquired, typically in the range 20-100. Semaphore 330 is designed to perform acquiring of a work permit as an atomic operation of checking that a work permit is available and then decreasing the count by one and to perform releasing of an acquired work permit by increasing the count by one.

Thread pool 340 represents a collection of threads that is created to perform the tasks in work queue 320. Thread pools facilitate a larger number of tasks to be performed using a fixed number of worker threads. The threads in thread pool are typically created when the thread pool is initialized, and are repeatedly re-used to perform the larger number of tasks. As such, the overhead of creating/terminating threads for performance of each task in work queue 320 may be avoided.

For illustration, thread pool 340 is shown as having worker threads 360A-360C. However, the number of threads to be created in thread pool 340 may be pre-configured (to provide the best performance) or may be dynamically determined based on the number of pending tasks in work queue 320.

Each of worker threads 360A-360C represents a thread/stream of execution designed to check for a pending task in work queue 320, remove the task from work queue 320 (if present) and to perform the task.

In one embodiment, each worker thread performs the task of transferring a data file by invoking the operations of a web service exposed by storage 130. The worker thread stores the data file by sending one or more requests to the web service for storing corresponding chunks/portions of the data file. The worker thread also inspects the corresponding responses received for the requests to determine whether the storage of the chunks (and accordingly the whole data file) has been successfully performed.

On successful completion of the task, the worker thread checks for the next pending task in work queue 320 until all tasks in work queue 320 have been completed (and the work queue 320 is empty). The worker thread may then terminate, or sleep until new tasks are added to work queue 320.

Each of worker threads 360A-360C is also designed to acquire a work permit from semaphore 330 before performance of a task (in one implementation, even before removing the task from work queue 320) and to release the work permit after successful completion of the task. Thus, worker thread 360B is shown receiving a pending task from work queue 320 and also acquiring a work permit from semaphore 330, performing the task of transferring one of data files 310 to storage 130 (as a corresponding one of data files 390) and then releasing the work permit to semaphore 330.

In a scenario that the worker thread fails to complete performance of the task, for example, due to occurrence of errors during performance of the task, the worker thread sends a stop/error notification to supervisor thread 370 and logs the details of the error in an error register (not shown). The error register represents a portion of volatile memory that is used to maintain details of errors that occur during performance of the various tasks (transfer of data files).

Supervisor thread 370, provided according to several aspects of the present invention, represents a thread that is concurrently executed with worker threads 360A-360C. Supervisor thread 370 is designed to monitor for a stop notification either from one of worker threads 360A-360C (in response to an error) or from a user indicating that file transfer tool 150 is to be stopped (for example, a user input indicating that the transfer is to be cancelled or aborted).

In one embodiment, a second semaphore (different from semaphore 330 and not shown in FIG. 3) initialized to zero maximum instances is used for receiving the stop notification. Supervisor thread 370 is designed to acquire an instance from the second semaphore on initialization and accordingly waits for an instance to be released (as the initial value is zero). Thus, supervisor thread 370 is blocked from performing further actions until an instance of the second semaphore is released. Each of worker threads 360A-360C is designed to release an instance of the second/blocking semaphore on determination of an error to cause unblocking of supervisor thread 370. The release of an instance of the second semaphore may also be performed when a user input is received indicating that file transfer tool 150 is sought to be stopped.

On identifying that a stop notification is received (that is, when the supervisor thread is unblocked), supervisor thread 370 sends a request to semaphore 330 for acquiring all the work permits (the maximum number to which semaphore 330 was initialized). Such a request ensures that work permits that have not yet been acquired by worker threads are acquired by supervisor thread 370, thereby denying the worker threads from further acquiring any work permits. Furthermore, the request waits until that all the already acquired work permits are released by the worker threads. Semaphore 330 sends a response to the request for acquiring all the work permits only when all the work permits are released by the worker threads.

On receiving a response from semaphore 330, supervisor thread 370 "gracefully" stops execution of file transfer tool 150, as all the currently performing tasks are completed before the multi-threaded application is stopped.

In one embodiment, supervisor thread 370 is also designed to recover the multi-threaded application from a potential failure state, and to continue performance of the tasks after recovery. The recovery may be performed without stopping the application or shutting down the system. For example, when a file 10 error causes the stop indication to be received, supervisor thread 370 may be designed to wait for a pre-specified duration after acquiring all the work permits and to start performance of the tasks (by releasing the work permits) after the pre-specified duration has elapsed.

Though only the operation of a single worker thread (360B) is described above, it may be appreciated that the other worker threads operate similarly to cause data files 310 stored in data center 110B to be transferred to storage 130 as a corresponding ones of data files 390. A compliance report based on the information in data files 390 may then be generated (by compliance report server 170) for the customer.

In one embodiment, file transfer tool 150 is provided on a Software As A Service (SaaS) platform as a corresponding software service. Accordingly, a customer having multiple data centers can transfer compliance information from the multiple data centers (located at different physical locations) to storage 130 by invoking the software service for each data center, and then generate a compliance report covering all the data centers.

Though several techniques of the present invention are described above with respect to a specific implementation of semaphore ("counting semaphore"), it may be appreciated that alternative semaphore implementations such as using an array of semaphores, one or an array of MUTEX (a semaphore for controlling access to only one instance of a shared resource and which indicates whether the instance is locked/not accessible or available/accessible), or a combination thereof may be used without departing from the scope and spirit of the invention.

Figure 4:
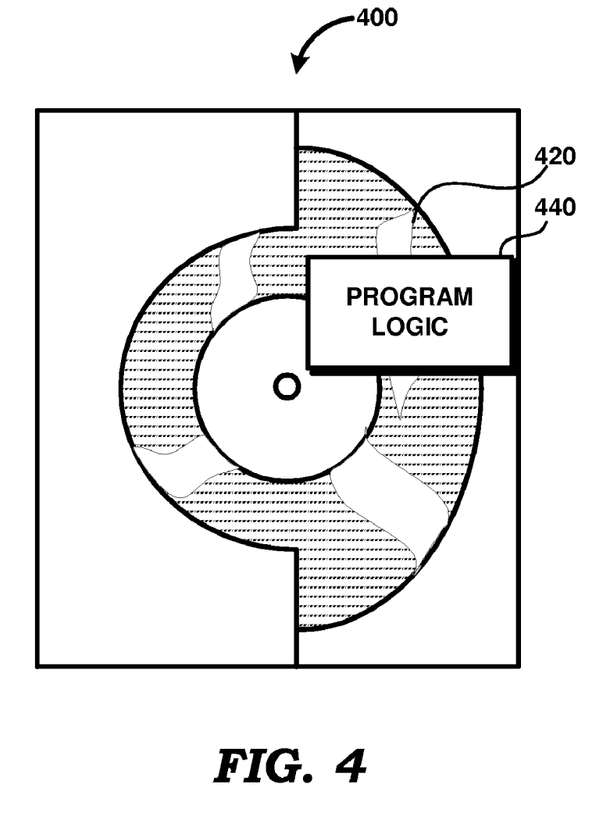
FIG. 4 shows a computer-readable medium encoded for computer-execution of graceful stopping of a multi-threaded application embodiment of FIG. 2.

FIG. 4 shows a computer-readable medium encoded for computer-execution of graceful stopping of a multi-threaded application embodiment of FIG. 2. Program logic 440 embodied on computer-readable medium 420 is encoded in computer-executable code configured for carrying out the prediction of the policies and other aspects of the present invention described herein and thereby forms a computer program product 400.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of a program code, which when received and loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method of stopping a multi-threaded application, wherein the multi-threaded application comprises a plurality of threads performing a plurality of tasks, the method comprising:

maintaining a set of work permits, wherein each of the plurality of threads is required to acquire one of the set of work permits before performing one of the plurality of tasks and to release the acquired work permit after completion of performance of the task;

allowing the plurality of threads to acquire a first subset of work permits and a second subset of work permits, wherein the first subset of work permits and the second subset of work permits are contained in the set of work permits;

receiving after the allowing, at a time instance, a stop notification indicating that the multi-threaded application is to be stopped, wherein all of the first subset of work permits are released by the time instance and none of the second subset of work permits is released by the time instance; and after the time instance and in response to receiving of the stop notification:

denying the plurality of threads from acquiring any additional work permit such that none of the plurality of threads can start performance of any new tasks;

waiting for all of the second subset of work permits to be released; and stopping the multi-threaded application only when all of the set of work permits, including the second subset of work permits, are released by the plurality of threads.

2. The method of claim 1, wherein the maintaining of the set of work permits is implemented as a semaphore indicating a count of the number of work permits, wherein acquiring a work permit is performed by an atomic operation comprising checking that the count is greater than zero and decreasing the count by one and wherein releasing a work permit is performed by increasing the count by one.

3. The method of claim 1, wherein each of the plurality of tasks comprises transferring of one of a plurality of data files from a data center to a storage.

4. The method of claim 3, wherein the plurality of data files contains compliance information related to applications hosted for a customer, wherein a compliance report server generates a compliance report for the customer after transfer of the plurality of data files to the storage is successfully completed.

5. The method of claim 1, wherein the stop notification is received in response to a user input requesting termination of the multi-threaded application.

6. The method of claim 1, wherein the stop notification comprises notification of an error from one of the plurality of threads.

7. The method of claim 6, wherein the multi-threaded application is executed in a system, wherein the error is a critical error requiring the shutdown of the system, the method further comprising shutting down the system only after the stopping of the multi-threaded application.

8. The method of claim 6, wherein the error is one of a file IO error, a connectivity error, an invalid filename error, and an application error.

9. The method of claim 1, wherein the multi-threaded application is implemented in a Java programming environment.

10. The method of claim 9, wherein the steps of the maintaining, the allowing, the receiving, the denying, the waiting and then the stopping together forms a design pattern for gracefully stopping any multi-threaded application implemented in the Java programming environment.

11. A computing system comprising:
a data center to store a plurality of data files containing compliance information related to applications hosted for a customer;
a storage to which the plurality of data files is to be transferred;
a compliance report server to generate a compliance report for the customer after transfer of the plurality of data files to the storage is successfully completed; and
a file transfer tool implemented as a multi-threaded application comprising a plurality of threads performing a plurality of tasks, wherein each of the plurality of tasks comprises transferring of one of the plurality of data files from the data center to the storage, the file transfer tool further operable to:
maintain a set of work permits, wherein each of the plurality of threads is required to acquire one of the set of work permits before performing one of the plurality of tasks and to release the acquired work permit after completion of performance of the task;
allow the plurality of threads to acquire a first subset of work permits and a second subset of work permits, wherein the first subset of work permits and the second subset of work permits are contained in the set of work permits;
receive after the allowing, at a time instance, a stop notification indicating that the file transfer tool is to be stopped, wherein all of the first subset of work permits are released by the time instance and none of the second subset of work permits is released by the time instance; and
after the time instance and in response to receiving of the stop notification:
deny the plurality of threads from acquiring additional work permit such that none of the plurality of threads can start performance of any new tasks;
wait for all of the second subset of the set of work permits to be released; and
stop the multi-threaded application only when all of the set of work permits, including the second subset of work permits are released by the plurality of threads,
wherein at least one of the data center, the storage, the compliance report server and the file transfer tool comprises a processor retrieving instructions and executing the retrieved instructions.

12. The computing system of claim 11, wherein the maintenance of the set of work permits is implemented as a semaphore indicating a count of the number of work permits, wherein acquiring a work permit is performed by an atomic operation comprising checking that the count is greater than zero and decreasing the count by one and
wherein releasing a work permit is performed by increasing the count by one.

13. The computing system of claim 12, wherein the file transfer tool is provided on a SaaS platform as a corresponding software service, whereby another customer having applications hosted in a set of data centers is enabled to transfer compliance information from each of the set of data centers to the storage by invoking the software service for each of the set of data centers, and then generate another compliance report covering all of the set of data centers.

14. The computing system of claim 13, wherein the stop notification comprises a notification of an error from one of the plurality of threads.

15. The computing system of claim 14, wherein the file transfer tool is executed in a system, wherein the error is a critical error requiring the shutdown of the system, wherein the system is shut down only after the stopping of the file transfer tool.

16. A non-transitory machine readable storage medium storing one or more sequences of instructions for causing a system to shutdown, the system executing a plurality of threads performing a plurality of tasks, wherein each of the plurality of threads is required to acquire a work permit before performing one of the plurality of tasks and to release the acquired work permit after completion of performance of the task, wherein execution of the one or more sequences of instructions by one or more processors contained in the system causes the system to perform the actions of:
allowing the plurality of threads to acquire a first subset of work permits and a second subset of work permits;
identifying after the time instance, at a time instance that the system needs to be shutdown, wherein all of the first subset of work permits are released by the time instance and none of the second subset of work permits is released by the time instance;
after the time instance and in response to the identifying:
denying the plurality of threads from acquiring any of a third set of work permits, wherein the third set of work permits comprises of the work permits that have not yet been acquired by the plurality of threads;
waiting for all of the second set of work permits to be released; and
shutting down the system only when all of the second set of work permits are released by the plurality of threads.

17. The non-transitory machine readable storage medium of claim 16, further comprising implementing a semaphore indicating a count of the number of work permits, wherein acquiring a work permit is performed by an atomic operation comprising checking that the count is greater than zero and decreasing the count by one, and wherein releasing a work permit is performed by increasing the count by one.

18. The non-transitory machine readable storage medium of claim 17, wherein the one or more sequences of instructions comprises an operating system executing in the system.

19. The non-transitory machine readable storage medium of claim 18, wherein the identifying comprises determining that a critical error has occurred in one of the plurality of threads.

20. The non-transitory machine readable storage medium of claim 19, wherein the critical error is one of a file IO error, a connectivity error, an invalid filename error, and an application error.

* * * * *